(12) United States Patent
Telehowski

(10) Patent No.: US 7,128,362 B2
(45) Date of Patent: Oct. 31, 2006

(54) STOWAGE SYSTEM FOR A RETRACTABLE ROOF OF A CONVERTIBLE VEHICLE

(75) Inventor: Stephen G Telehowski, Novi, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 155 days.

(21) Appl. No.: 11/056,504

(22) Filed: Feb. 10, 2005

(65) Prior Publication Data

US 2006/0175864 A1    Aug. 10, 2006

(51) Int. Cl.
*B60J 7/20* (2006.01)

(52) U.S. Cl. .................................... 296/107.08; 296/76

(58) Field of Classification Search .......... 296/107.08, 296/76, 136.03, 136.04, 136.05, 136.06; 49/193

See application file for complete search history.

(56) References Cited

U.S. PATENT DOCUMENTS

| | | | |
|---|---|---|---|
| 6,174,015 B1 * | 1/2001 | Shave | 296/76 |
| 6,254,165 B1 | 7/2001 | Neubrand | |
| 6,293,605 B1 | 9/2001 | Neubrand | |
| 6,454,343 B1 | 9/2002 | Wagner et al. | |
| 6,478,362 B1 | 11/2002 | Obendiek | |
| 6,783,170 B1 * | 8/2004 | Van Den Acker et al. | 296/76 |
| 2002/0171258 A1 * | 11/2002 | Obendiek | 296/107.08 |
| 2003/0218353 A1 * | 11/2003 | Russke | 296/107.08 |
| 2003/0227189 A1 * | 12/2003 | Russke et al. | 296/76 |
| 2004/0155480 A1 * | 8/2004 | Willard | 296/107.08 |

* cited by examiner

*Primary Examiner*—Lori L. Coletta
(74) *Attorney, Agent, or Firm*—Ralph E. Smith

(57) ABSTRACT

A stowage system for a retractable roof of a convertible automotive vehicle has a tonneau and a deck lid for covering the open top of a stowage compartment. The tonneau is hinged to a fixed frame structure of the vehicle and the deck lid is hinged to the tonneau. In their closed positions, the tonneau and the deck lid close the open top of the stowage compartment and in their open positions the tonneau and the deck lid provide clearance enabling the retractable roof to be moved into and out of a stowed position in the stowage compartment.

6 Claims, 3 Drawing Sheets

STOWAGE SYSTEM FOR A RETRACTABLE ROOF OF A CONVERTIBLE VEHICLE

FIELD OF THE INVENTION

The present invention relates generally to convertible automotive vehicles and more particularly to a stowage system for a retractable roof of a convertible automotive vehicle.

BACKGROUND OF THE INVENTION

In a convertible automotive vehicle, a tonneau is often provided to cover the convertible roof when it is put down and stowed. Such vehicles may also have a deck lid to open and close the trunk. Typically, the articulation of the tonneau and the articulation of the deck lid are entirely separate. The separate articulation of the tonneau and the deck lid tends to restrict the free movement of the tonneau during its transfer to and from a stowed position.

SUMMARY OF THE INVENTION

In accordance with the present invention, a stowage system for a retractable roof is provided having both a tonneau and a deck lid for covering the open top of a stowage compartment. The tonneau is hinged to a fixed frame structure of the vehicle and the deck lid is hinged to the tonneau. In other words, there is a dual articulation of the deck lid.

More particularly, the tonneau has a rear portion pivoted for swinging movement between an open position and a closed position. The deck lid has a front portion pivoted to the tonneau for swinging movement between an open position and a closed position. The tonneau and the deck lid in their closed positions together substantially close the open top of the stowage compartment and in their open positions enable the retractable roof to be moved into and out of a stowed position in the stowage compartment.

Further in accordance with the invention, separate power mechanisms are provided for swinging the tonneau and the deck lid. These power mechanisms are disposed in the stowage compartment adjacent to side walls in the stowage compartment in positions such that they do not interfere with the retractable roof when in the stowed position or when the retractable roof is transferred to and from the stowed position.

Preferably the stowage compartment comprises a front area adapted to be occupied by the retractable roof in the stowed position and a rear area for the stowage of articles other than the retractable roof.

One object of this invention is to provide a stowage system for a retractable roof of an automotive vehicle which has one or more of the foregoing features and capabilities.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
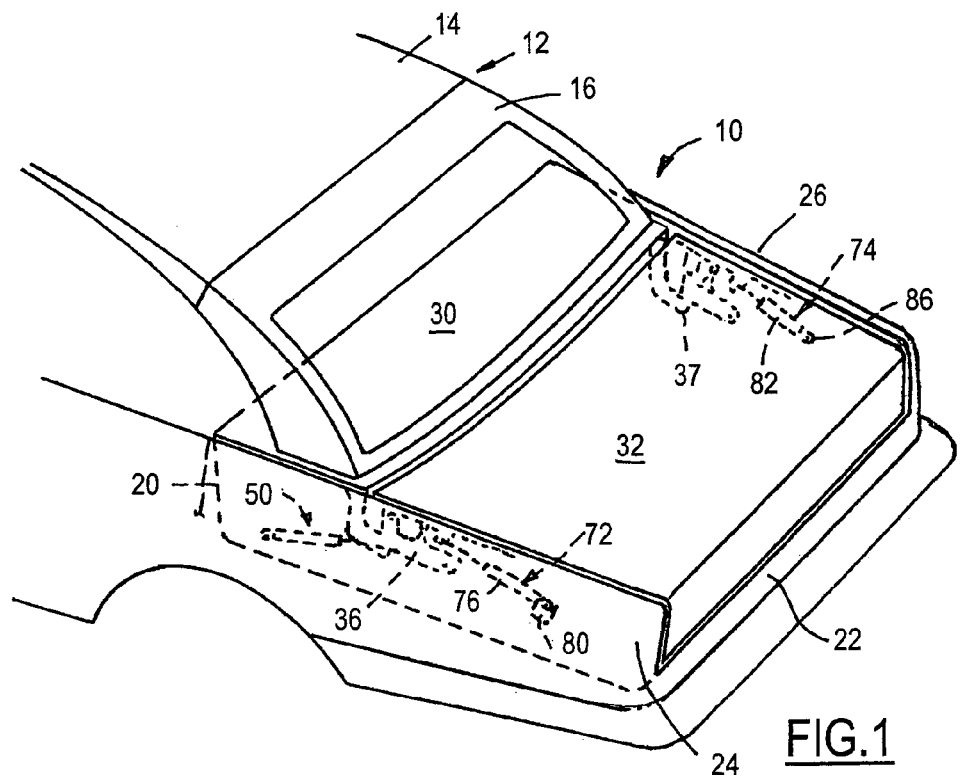
FIG. 1 is a perspective view of the rear end portion of a convertible automotive vehicle having a tonneau and deck lid constructed in accordance with the invention.

The following description of the preferred embodiment is merely exemplary in nature and is in no way intended to limit the invention, its application, or uses.

Referring now more particularly to the drawings, a convertible type automotive vehicle 10 is shown having a convertible top or roof 12 composed of a front roof section 14 and a rear roof section 16. A trunk or stowage compartment 18 is provided in a well at the rear of the vehicle. The stowage compartment has a front wall 20, a rear wall 22 and side walls 24 and 26. A cover 28 for the stowage compartment 18 includes a tonneau 30 over the front portion of the stowage compartment and a deck lid 32 over the rear portion of the stowage compartment.

Figure 7:
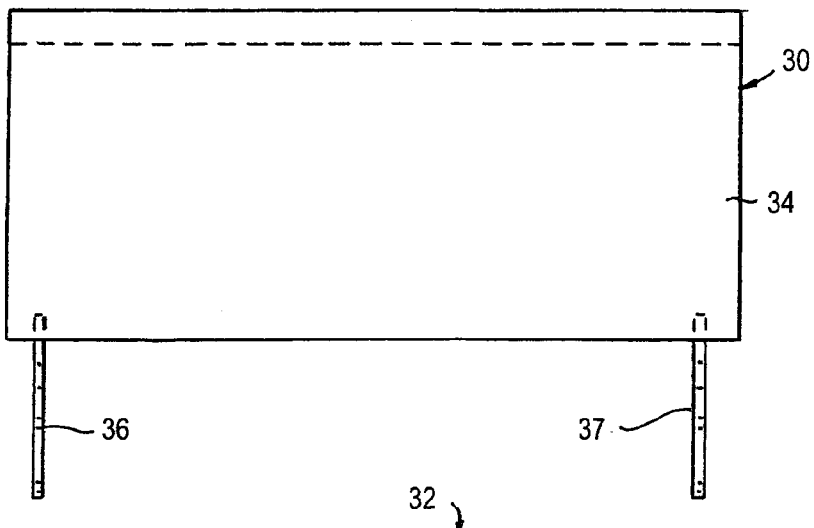
FIG. 7 is a plan view of the tonneau.
Figure 4:
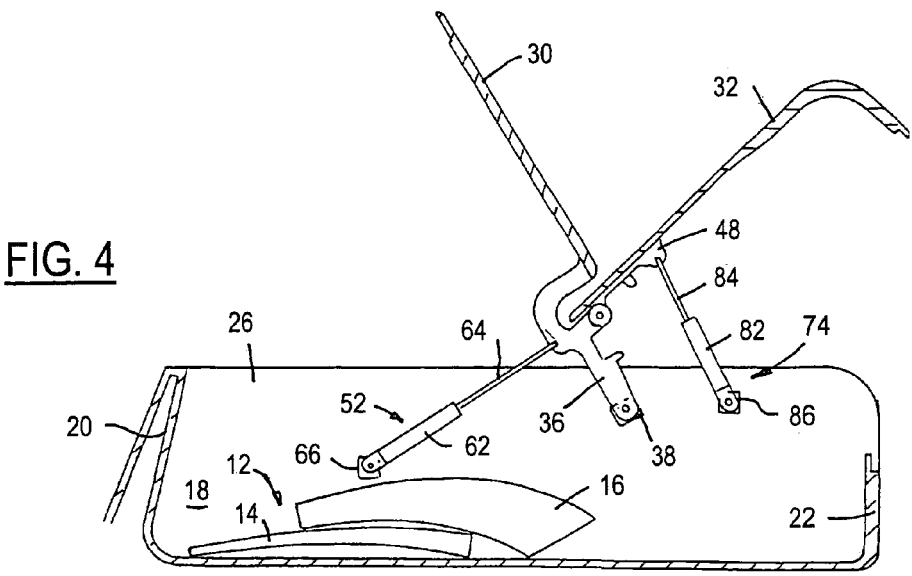
FIG. 4 is like FIG. 2 but shows the deck lid and the tonneau in the open position.
Figure 5:
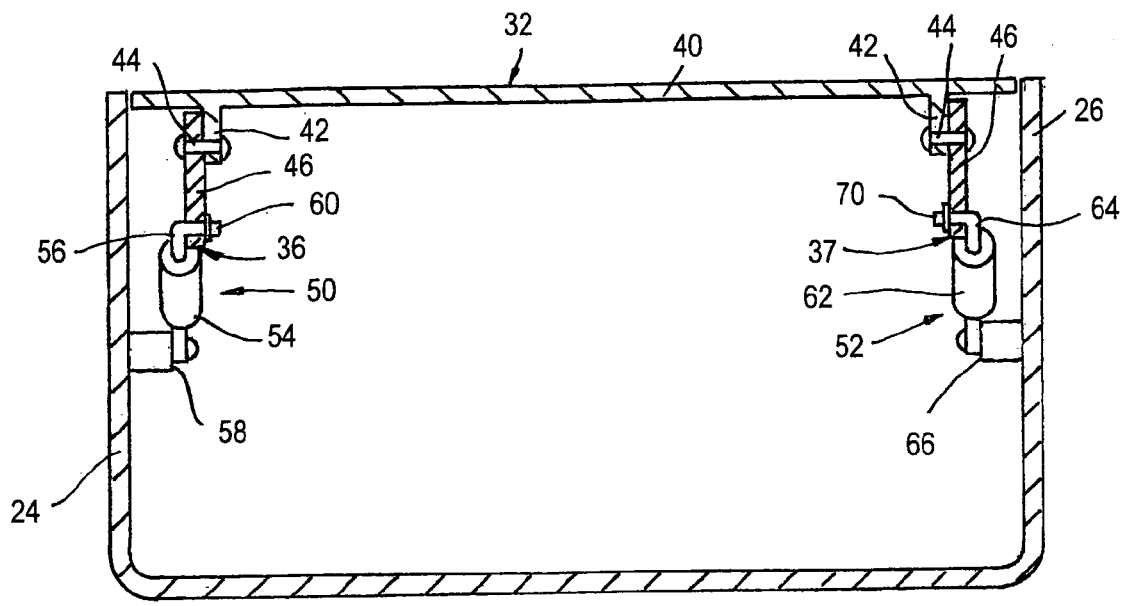
FIG. 5 is a sectional view taken on the line 5—5 in FIG. 2.
Figure 6:
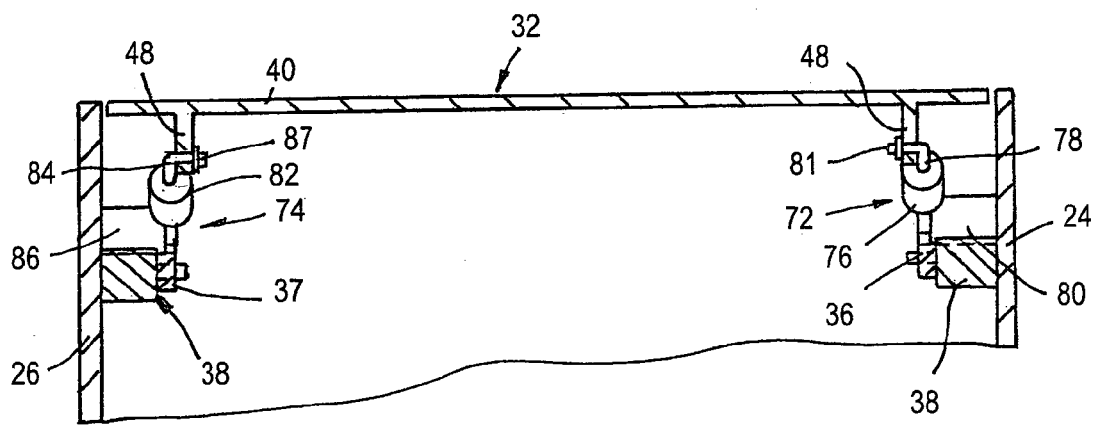
FIG. 6 is a sectional view taken on the line 6—6 in FIG. 2.

The tonneau 30 comprises a generally rectangular panel 34 having struts 36 and 37 at the sides protruding rearwardly from the two rear comers (FIG. 7). The struts 36 and 37 are pivoted on pivot mounts 38 secured to rigid frame structure of the vehicle, more specifically, to the opposite side walls 24 and 26 of the stowage compartment. The pivot mounts 38 are horizontally aligned and establish a transverse horizontal axis of swinging movement for the tonneau 30. The tonneau pivots between a closed position and an open position relative to the stowage compartment 18. When in the closed position shown in FIG. 2, the tonneau 30 covers the front portion of the stowage compartment 18 with its front and side edges having a sealed relationship with the top edges of the front and side walls 24 and 26. The open position of the tonneau is shown in FIG. 4.

Figure 8:
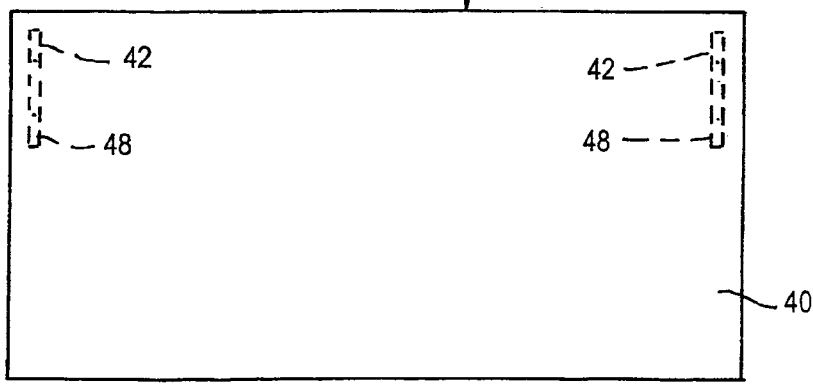
FIG. 8 is a plan view of the decklid.

The deck lid 32 comprises a generally rectangular panel 40 (FIG. 8). Near the front, the deck lid 32 has tabs 42 on opposite sides. The tabs 42 are on the undersurface of the panel 40 and are pivoted by pins 44 to tabs 46 which project upwardly from the struts 36 and 37 forwardly of the pivot mounts 38. The pivot pins 44 are transversely aligned to establish a horizontal transverse axis of swinging movement for the deck lid 32. When closed as in FIG. 2, the front, rear and side edges of the deck lid have a sealed relationship with the top edges of the front, rear and side walls of the stowage compartment 18. The deck lid 32 also has tabs 48 on the undersurface. The open position of the deck lid is shown in FIGS. 3 and 4.

When both the tonneau 30 and the deck lid 32 are in their open positions, the front and rear roof sections 14 and 16 can be transferred into and out of a stowed position in the stowage compartment 18. The roof sections 14 and 16 are shown in their normal positions of use in FIG. 2, and in their stowed positions in the stowage compartment 18 in FIG. 4. The mechanism for transferring the roof sections 14 and 16 into and out of the stowage compartment is not illustrated since it forms no part of the present invention. However, it will be noted in FIG. 3 that the mechanism for transferring the roof sections lifts the rear section 16 (or back light) upwardly as its first motion so that the tonneau can swing to the open position.

The tonneau 30 is pivoted between its open and closed positions by power mechanisms preferably in the form of hydraulic piston and cylinder assemblies 50 and 52. The assembly 50 includes a cylinder 54 and a piston 56 reciprocable within the cylinder. The cylinder 54 is pivoted to the side wall 24 of the stowage compartment 18 on a horizontal transverse pivot mount 58 closely adjacent to the side wall 24. The piston 56 is pivoted to the strut 36 by a pivot pin 60. The assembly 52 includes a cylinder 62 and a piston 64 reciprocable within the cylinder 62. The cylinder 62 is pivoted to the side wall 26 of the stowage compartment 18 on a horizontal transverse pivot mount 66 closely adjacent to the side wall 26. The piston 64 is pivoted to the strut 37 by a pivot pin 70.

The deck lid 32 is pivoted between its opened and closed positions by power mechanisms preferably in the form of hydraulic piston and cylinder assemblies 72 and 74. The assembly 72 includes a cylinder 76 and a piston 78 reciprocable within the cylinder. The cylinder 76 is pivoted to the side wall 24 of the stowage compartment 18 on a horizontal transverse pivot mount 80 closely adjacent to the side wall 24. The piston 78 is pivoted to one of the tabs 48 on the deck lid 32 by a pivot pin 81. The assembly 74 includes a cylinder 82 and a piston 84 reciprocable within the cylinder 82. The cylinder 82 is pivoted to the side wall 26 of the stowage compartment 18 on a horizontal transverse pivot mount 86 closely adjacent to the side wall 26. The piston 84 is pivoted to one of the tabs 48 on the deck lid 32 by a pivot pin 87.

In their stowed positions, the front and rear roof sections 14 and 16 occupy the front area of the stowage compartment 18. The rear area of stowage compartment is for the stowage of articles other than the retractable roof.

Figure 2:
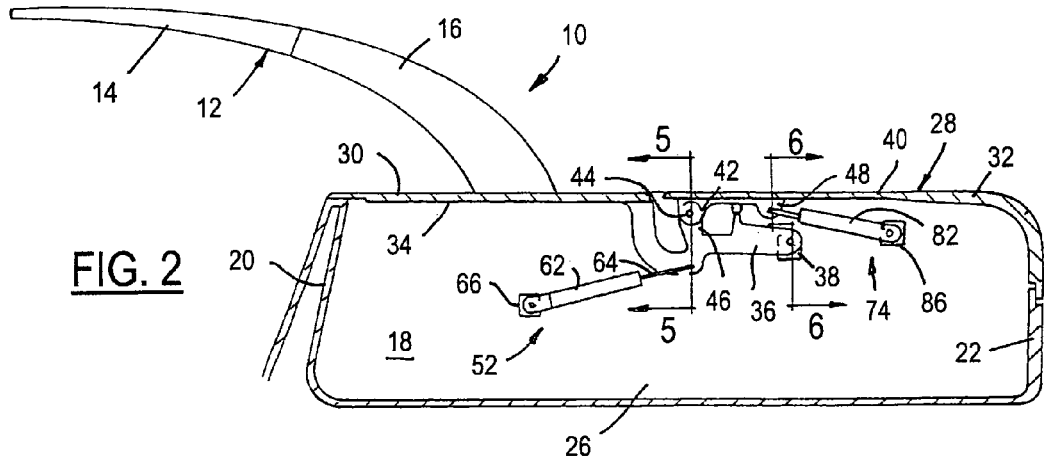
FIG. 2 is a sectional view showing the tonneau and deck lid in a closed position.
Figure 3:
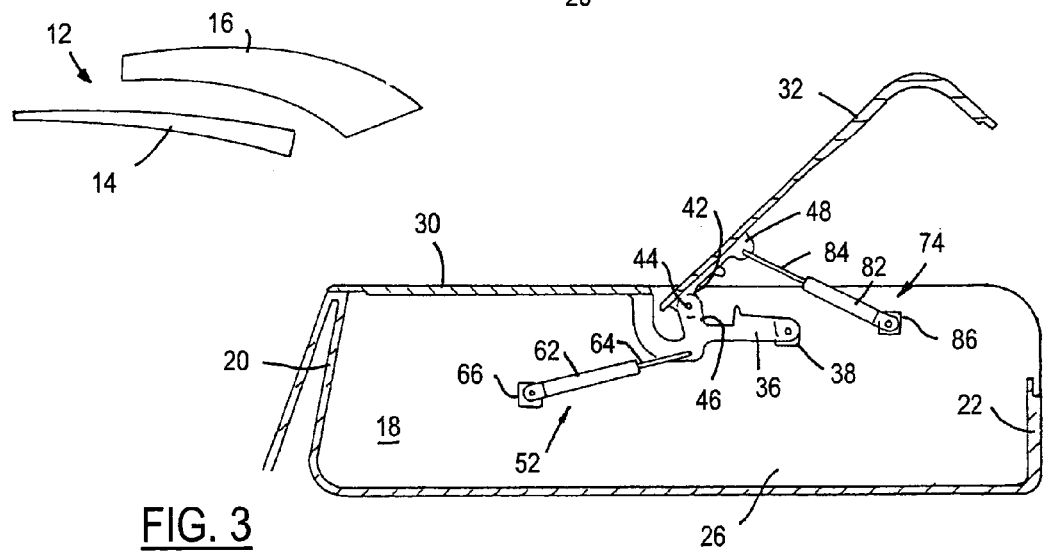
FIG. 3 is like FIG. 2 but shows the deck lid in an open position.

FIG. 2 shows the retractable roof 12 in the normal position of use and the tonneau 30 and deck lid 32 in their closed positions.

FIG. 3 shows the deck lid 32 pivoted to its open position for the purpose of loading and unloading articles to and from the rear area of the stowage compartment 18. The roof 12 is shown partially retracted in preparation for its transfer into the stowage compartment 18.

FIG. 4 shows both the tonneau 30 and the deck lid 32 in their open positions, enabling the entire retractable roof 12 to be transferred into or out of the front portion of the stowage compartment 18. The retractable roof 12, including both the front roof section 14 and the rear roof section 16 are shown in FIG. 4 stowed in the front area of the stowage compartment 18.

The power mechanisms including the piston and cylinder assemblies 50, 52, 72 and 74, are positioned close to the side walls 24 and 26 of the stowage compartment so as not to consume valuable trunk space and also not to interfere with the retractable roof 12 when it is stowed or with the transfer of the retractable roof to or from the stowed position. The pivoting of the deck lid 32 on the tonneau 30 in the manner shown provides a dual articulation for the deck lid and causes it to be raised high above the stowage compartment 18 when opened, so that the open tonneau and the open deck lid provide ample clearance enabling the retractable roof 12 to be moved into and out of a stowed position in the stowage compartment.

Also, this dual articulation of the deck lid keeps the deck lid from traveling rearward of the rear bumper (a European requirement). Moreover, the use of hydraulic cylinders that power the deck lid allow an automatic open and close feature for the normal deck lid function as distinguished from the use of gas cylinders that just provide a lift assist.

The latching of the deck lid in the closed position may be accomplished by a power pull-down latch which is common on luxury cars today.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A stowage system for a retractable roof of a convertible automotive vehicle, comprising:
    a stowage compartment in a well of the vehicle having a bottom wall, a front wall, spaced apart side walls and an open top,
    a cover for the open top of said stowage compartment comprising a tonneau and a deck lid,
    said tonneau having a rear portion pivoted for swinging movement of said tonneau between an open position and a closed position about a first transverse axis,
    said deck lid having a front portion pivoted to said tonneau for swinging movement of said deck lid between an open position and a closed position about a second transverse horizontal axis located between said first transverse horizontal axis and a front portion of the tonneau,
    a first mechanism for swinging said tonneau between the open and closed positions thereof, and
    a second mechanism for swinging said deck lid between the open and closed positions thereof,
    said tonneau and said deck lid in the closed positions thereof together substantially closing the open top of the stowage compartment and in the open positions thereof provide clearance enabling said retractable roof to be moved into and out of a stowed position in said stowage compartment.

2. The stowage system of claim 1, wherein said tonneau comprises a panel and supporting struts on opposite sides of said panel, and the pivoting of the rear portion of said tonneau is effected by pivot mounts connecting said supporting struts to the opposite side walls of said stowage compartment.

3. The stowage system of claim 2, wherein said first mechanism and said second mechanism are so disposed as not to interfere with the retractable roof when in the stowed position or with the movement of the retractable roof into and out of the stowed position.

4. The stowage system of claim 3, wherein said first mechanism comprises first and second power devices disposed in said stowage compartment adjacent to the respective side walls of the stowage compartment and said second mechanism comprises third and fourth power devices disposed in said stowage compartment adjacent to the respective side walls of the stowage compartment.

5. The stowage system of claim 4, wherein said each of said power devices comprises a hyrdraulic piston and cylinder assembly.

6. The stowage system of claim 4, wherein said stowage compartment comprises a front area to be occupied by the retractable roof in the stowed position and a rear area for the stowage of articles other than the retractable roof.

* * * * *